(12) United States Patent
Patel et al.

(10) Patent No.: US 7,794,783 B2
(45) Date of Patent: Sep. 14, 2010

(54) ARTICLES HAVING WEAR-RESISTANT COATINGS AND PROCESS FOR MAKING THE SAME

(75) Inventors: Vaishali Bhagwanbhai Patel, Louisville, KY (US); Donald W. Bucholz, Charlestown, IN (US); Kevin Michael Singer, Louisville, KY (US)

(73) Assignee: Kennametal Inc., Latrobe, PA (US)

( * ) Notice: Subject to any disclaimer, the term of this patent is extended or adjusted under 35 U.S.C. 154(b) by 530 days.

(21) Appl. No.: 11/786,891

(22) Filed: Apr. 13, 2007

(65) Prior Publication Data

US 2007/0254171 A1   Nov. 1, 2007

Related U.S. Application Data

(63) Continuation-in-part of application No. 11/052,144, filed on Feb. 7, 2005.

(51) Int. Cl.
*B23K 1/00* (2006.01)
*B23K 1/20* (2006.01)
*B23K 101/34* (2006.01)
*B23K 103/16* (2006.01)

(52) U.S. Cl. .............. 427/128; 427/132; 427/201; 427/376.6; 228/262.9

(58) Field of Classification Search .............. None
See application file for complete search history.

(56) References Cited

U.S. PATENT DOCUMENTS

| | | | |
|---|---|---|---|
| 3,743,556 A | 7/1973 | Breton et al. | |
| 3,774,355 A * | 11/1973 | Dawson et al. | 451/527 |
| 3,918,217 A | 11/1975 | Oliver | |
| 4,173,685 A | 11/1979 | Weatherly | |
| 4,624,860 A * | 11/1986 | Alber et al. | 427/544 |
| 4,643,740 A * | 2/1987 | Nicolson | 51/293 |
| 4,693,379 A | 9/1987 | Stehle | |
| 5,276,075 A | 1/1994 | Santini | |
| 5,578,099 A * | 11/1996 | Neff | 51/297 |
| 5,891,204 A | 4/1999 | Neff | |
| 6,649,682 B1 | 11/2003 | Breton et al. | |
| 2002/0123302 A1* | 9/2002 | Maras et al. | 451/542 |
| 2003/0122414 A1* | 7/2003 | Sollami | 299/39.1 |
| 2006/0177677 A1 | 8/2006 | Singer et al. | |
| 2006/0210721 A1 | 9/2006 | Hall | |

FOREIGN PATENT DOCUMENTS

| | | |
|---|---|---|
| JP | 2002346456 A2 | 12/2002 |
| KR | 20-0159141 Y1 | 10/1999 |

* cited by examiner

*Primary Examiner*—Jennifer C McNeil
*Assistant Examiner*—Jason L Savage
(74) *Attorney, Agent, or Firm*—Matthew W. Smith

(57) ABSTRACT

A wear-resistant article of manufacture, such as a screen, is produced by the method of providing a screen having a front face, a rear face, and openings extending through the screen from the front face to the rear face, contacting at least a portion of the screen with a coating material comprising ferromagnetic or paramagnetic hard particles and a braze material, subjecting at least a portion of the screen to a magnetic field during at least a portion of the contacting step, and transforming the coating material to a wear-resistant coating comprising the hard particles distributed in the braze material.

33 Claims, 5 Drawing Sheets

ARTICLES HAVING WEAR-RESISTANT COATINGS AND PROCESS FOR MAKING THE SAME

CROSS-REFERENCE TO RELATED APPLICATION

This application is a continuation-in-part of U.S. application Ser. No. 11/052,144 filed Feb. 7, 2005, which is incorporated herein by reference.

FIELD OF THE INVENTION

The present invention relates to articles, such as screens and pipes, having wear-resistant coatings as well as to processes for making such wear-resistant articles.

BACKGROUND INFORMATION

Screens are often used in high erosion industrial environments where it is desirable to separate particulates from a fluid in which the particulates are entrained. The screens are typically in the form of grates, perforated plates or woven mesh. For example, steel screens are used in coal-fired power plants to capture and separate coarse fly ash particles from hot gas streams. Conventional screens subjected to such high erosion environments exhibit significant wear and must be replaced or repaired frequently, resulting in lost productivity while the worn screens are removed from operation.

Published U.S. Patent Application No. US 2006/0210721 A1 to Hall discloses thermal spray processes for coating metal screens in which multiple spray heads direct coating materials onto the screen from different angles. Although the thermally sprayed coatings of Hall '721 are said to increase wear resistance of the screens, they suffer from problems such as excessive waste of the wear resistant material.

U.S. Pat. No. 6,649,682 B1 to Breton et al., which is incorporated herein by reference, discloses a paint system and process for hardfacing metal surfaces such as fan blades, pipes, pumps and valves. In the '682 Brenton et al. patent, a paint that includes a dispersion of hard particles is first applied as a coating to the surface of the substrate. Next, a paint including a dispersion of braze alloy is applied over the layer of hard particles. The substrate is then heated to cause the braze alloy to melt and infiltrate into the hard particles thereby bonding them to the metallic surface. The '682 Brenton et al. patent also discloses an embodiment of the process wherein a first layer of adhesive is applied to the substrate and a hardfacing powder is then applied to the adhesive. A second layer of adhesive is applied and a braze alloy powder is applied to the second adhesive. The substrate is then heated whereby the braze alloy melts and infiltrates into the hard particles so as to bond them to the metallic surface. In a third embodiment of the '682 Breton et al. patent, a hardfacing alloy powder containing precipitated intermetallic hard compounds is made into a paint and applied to the surface that is to be protected. After drying, the paint is heated to form a coating. In a fourth embodiment, hardfacing particles and braze alloy powder are made into a paint and applied to the surface to be protected. The paint is then dried and heated to form the coating.

In a process such as that disclosed in '682 Breton et al. patent, in order to obtain a layer of the paint that includes a dispersion of hard materials that has sufficient thickness, it takes multiple coats (or dips) of the substrate into the paint to achieve the necessary cladding thickness. At sharp corners or edges of the substrate the paint has a tendency to pull away which results in a thinner cladding and a premature wear in these areas adjacent to the sharp corners or edges of the substrate.

It would be desirable to provide a coating process which produces a highly effective wear-resistant coating on an article, such as a screen.

It would also be desirable to provide an article, such as a screen, with a wear-resistant coating which significantly increases wear resistance of the article when subjected to high erosion environments.

SUMMARY OF THE INVENTION

An aspect of the present invention is to provide a wear-resistant article of manufacture comprising: a magnetically deposited wear-resistant coating comprising ferromagnetic or paramagnetic hard particles substantially uniformly distributed in a braze alloy matrix covering at least a portion of the article of manufacture, wherein the hard particles comprise at least 20 percent by area of the wear-resistant coating. In one embodiment, the hard particles of the wear-resistant coating may comprise at least 25 percent by area of the wear-resistant coating.

Another aspect of the present invention is to provide a method of forming a wear-resistant coating on an article of manufacture. The method comprises the steps of: contacting at least a portion of the article of manufacture with a coating material comprising ferromagnetic or paramagnetic hard particles and a braze material; subjecting at least a portion of the article of manufacture to a magnetic field during at least a portion of the contacting step; and transforming the coating material to a wear-resistant coating comprising the hard particles distributed in the braze material, wherein the coating material has a ratio of the hard particles to the braze material that is lower than a ratio of the hard particles to the braze material in the wear-resistant coating. In certain embodiments, the percentage by area of the hard particles in the wear-resistant coating is at least 20 or 25 percent.

A further aspect of the present invention is to provide a method of forming a wear-resistant coating on an article, such as a screen, comprising the steps of: providing a screen having a front face, a rear face, and openings extending through the screen from the front face to the rear face; contacting at least a portion of the screen with a coating material comprising ferromagnetic or paramagnetic hard particles and a braze material; subjecting at least a portion of the screen to a magnetic field during at least a portion of the contacting step; and transforming the coating material to a wear-resistant coating comprising the hard particles distributed in the braze material.

Another aspect of the present invention is to provide a wear-resistant screen comprising: a screen having a front face, a rear face, and openings extending through the screen from the front face to the rear face; and a magnetically deposited wear-resistant coating comprising ferromagnetic or paramagnetic hard particles substantially uniformly distributed in a braze alloy matrix covering at least a portion of the screen.

These and other aspects of the present invention will be more apparent from the following description.

DETAILED DESCRIPTION OF PREFERRED EMBODIMENT

Figure 1:
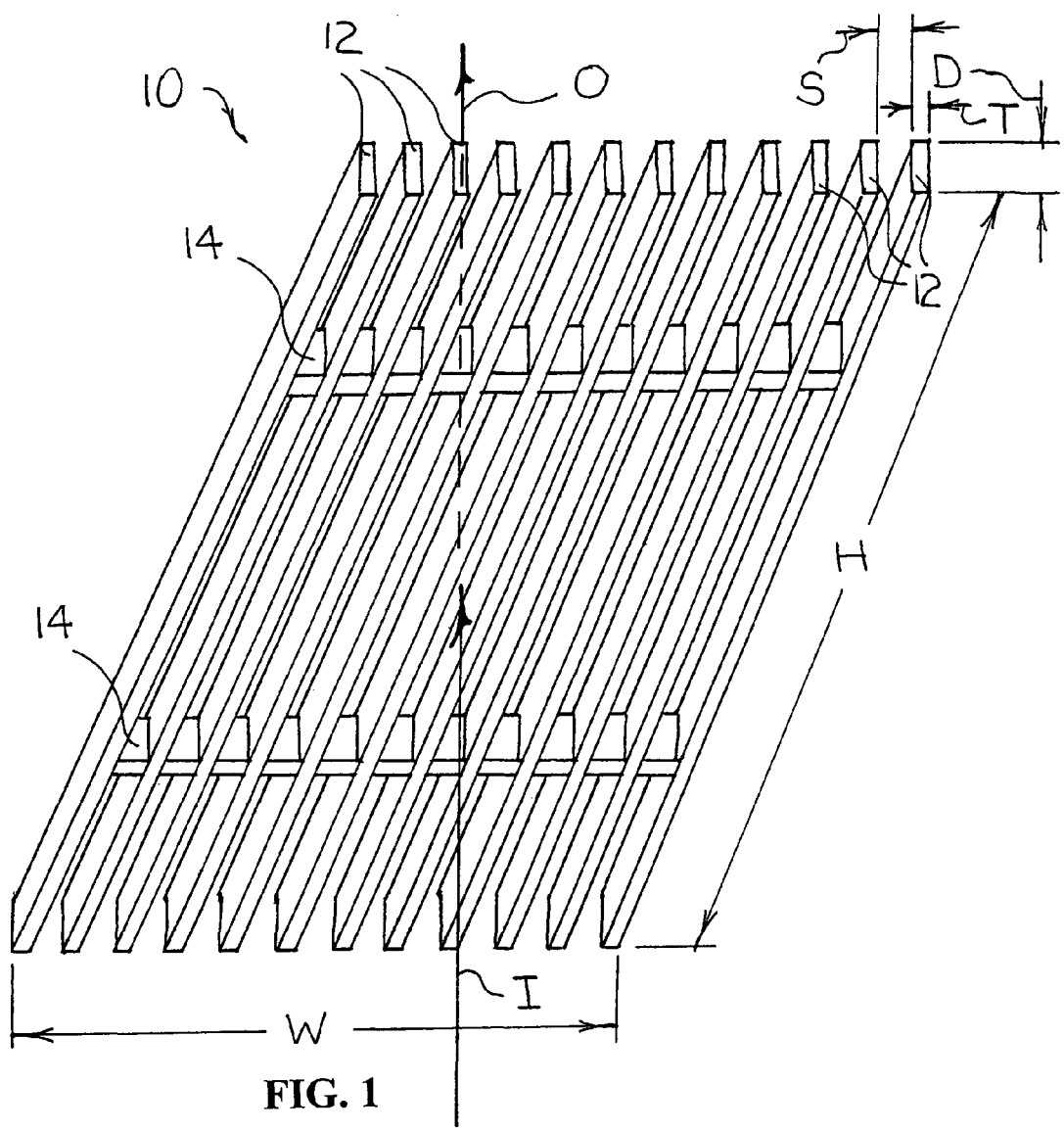
FIG. 1 is an isometric view of screen in the form of a grate which may be coated with a wear-resistant coating in accordance with an embodiment of the present invention.

FIG. 1 is an isometric view of a screen 10 having a wear-resistant coating in accordance with an embodiment of the present invention. The screen 10 is in the form of a grate including several vertical grate bars 12 connected by two horizontal support bars 14. Although the screen 10 shown in FIG. 1 includes several vertical bars 12 and two horizontal supports 14, any other suitable number, orientation and shape of the bars 12 and supports 14 may be utilized. For example, the cross-sectional shape of each grate bar 12 may be square or circular instead of the rectangular shape shown in FIG. 1. Furthermore, the screen 10 may be made from a sheet or plate of material having holes or perforations therein. For example, the screen may comprise a steel plate having circular, square or other shaped holes of desired sizes and spacing therethrough. The screen may also comprise a woven mesh structure. Accordingly, as used herein, the term "screen" is intended to include such various grate, perforated sheet and mesh structures. In addition to screens, other articles of manufacture such as pipes may be provided with wear-resistant coatings in accordance with the present invention. For example, at least a portion of the inner diameter of a pipe or a pipe elbow may be coated with the wear-resistant coating.

As shown in FIG. 1, the screen 10 is structured and arranged for placement in a fluid stream designated by the arrows I and O in FIG. 1. The inlet fluid stream I is directed against the front face of the screen 10, while the outlet fluid stream O is directed away from the back face of the screen 10 after passing through openings of the screen 10 formed between the grate bars 12. In one embodiment, the inlet fluid stream I may comprise a hot gas stream having flyash particles entrained therein, e.g., from a coal-fired power plant. Gas streams having temperatures above about 500° F. with entrained flyash particles having both fine and coarse particles are encountered in such power plants. A typical operating temperature range is from about 580 to 700° F. In this embodiment, the screen 10 separates the coarse flyash particles contained in the inlet stream I from the fine flyash particles and hot gas outlet stream O exiting from the rear side of the grate 10. The fine flyash particles that pass through the screen cause significant erosion. Furthermore, the coarse flyash particles and slag fragments that impact the screen can also cause significant wear.

The screen 10 has a height H, width W and depth D. The height H and width W of the screen 10 may vary depending on the particular application. For example, the height H may typically be from about 0.3 to about 6 m, the width W may typically be from about 0.3 to about 6 m, and the depth D may typically be from about 0.03 to about 4 cm.

Figure 2:
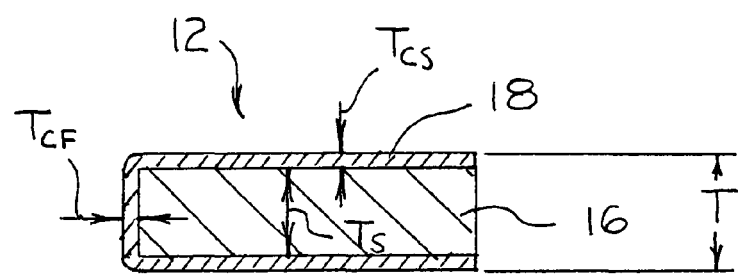
FIG. 2 is a cross-sectional view of one of the grate bars of the screen shown in FIG. 1 coated with a wear-resistant coating in accordance with an embodiment of the present invention.
Figure 3:
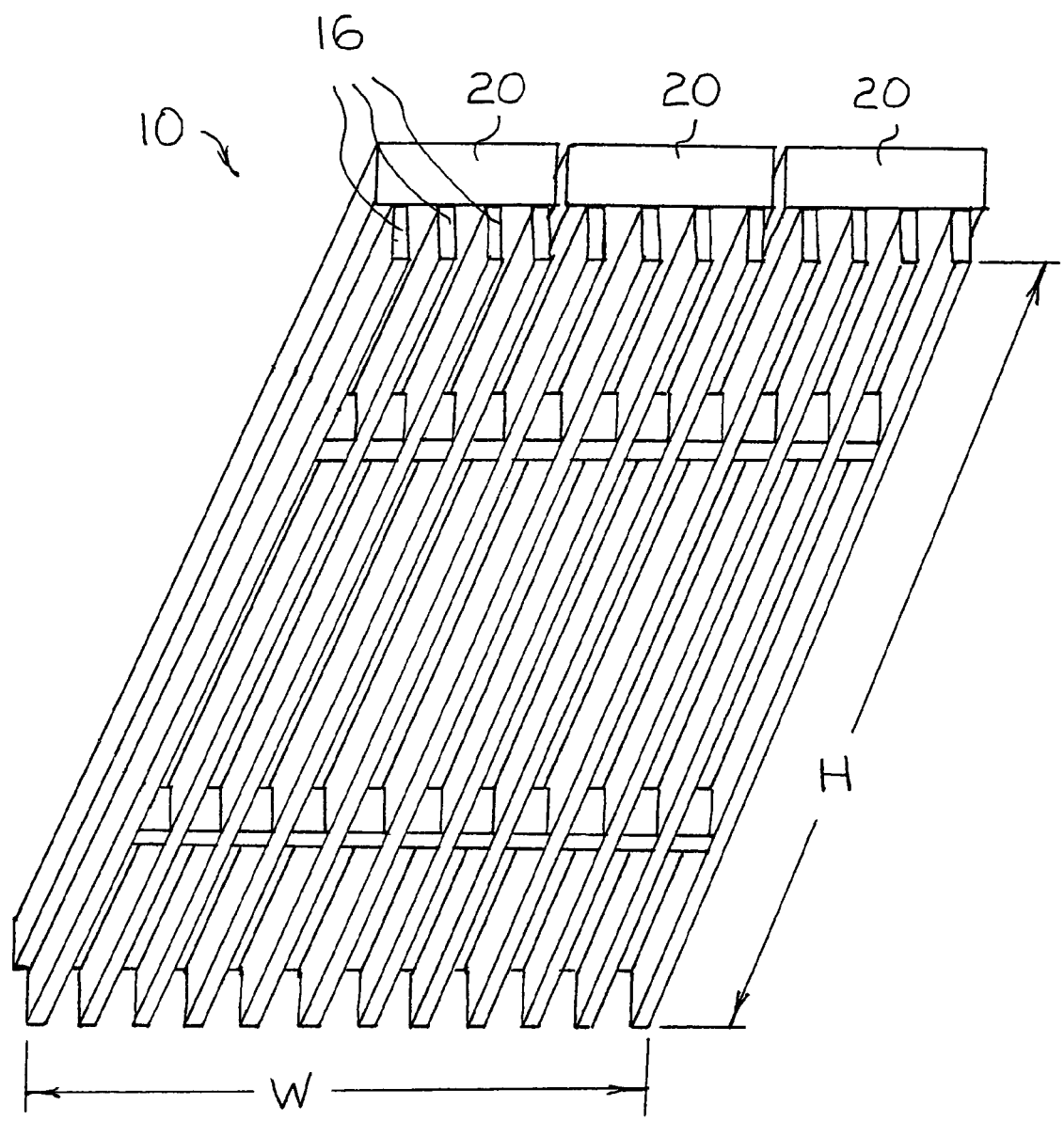
FIG. 3 is an isometric view of a screen to be coated with a wear-resistant coating having magnets fixed to a rear surface thereof in order to improve the coating deposition process in accordance with an embodiment of the present invention.

In the embodiment shown in FIGS. 1-3, each grate bar 12 has a thickness T and is separated a spacing distance S away from its adjacent grate bar 12. The thickness T of each grate bar 12 may typically be from about 0.1 to about 2 cm. The spacing S between adjacent grate bars 12 is typically from about 0.4 to about 6 cm.

When the screen is provided in the form of a perforated plate, the typical height and width are as noted above, and the typical depth or thickness of the plate is from about 0.025 to about 1.3 cm. The diameter of each hole is typically from about 0.4 to about 6 cm, and the center-to-center distance between adjacent holes is typically from about 0.6 to about 8 cm. The openings typically have a mesh size of 4 mesh or greater, corresponding to sieve openings of at least 4.76 mm.

When the screen is provided in the form of woven mesh, the typical height and width are as noted above, and the thickness corresponds to the wire diameter, typically from about 0.15 to about 0.5 cm. The center-to-center distance between adjacent wires is typically from about 0.6 to about 1.3 cm. The openings in the wire mesh have a size of at least 4 mesh, corresponding to sieve openings of at least 4.76 mm.

The screen 10 is typically made of a magnetically permeable material such as, for example, a ferromagnetic material or a paramagnetic material. Exemplary suitable screen materials include carbon and alloy steels, tool steels and martensitic and ferritic stainless steels.

FIG. 2 is a cross-sectional view of one of the coated grate bars 12 shown in FIG. 1. The grate bar 12 includes a substrate material 16 that is at least partially coated with a wear-resistant coating 18. The grate bar substrate 16 has a thickness $T_S$, while the coating 18 has a coating thickness $T_{CS}$ at each of its side surfaces, as well as a front coating thickness $T_{CF}$ at its front surface. The overall thickness T of the coated grate bar 12 is thus equal to the sum of the substrate thickness $T_S$ and the two side surface thicknesses $T_{CS}$ ($T=T_S+2T_{CS}$). The front coating thickness $T_{CF}$ typically ranges from about 0.1 to about 3 mm, and the side coating thickness $T_{CS}$ typically ranges from about 0.1 to about 1.3 mm. In one embodiment, the front and side coating thicknesses $T_{CF}$ and $T_{CS}$ are substantially the same. Alternatively, the front and side coating thicknesses $T_{CF}$ and $T_{CS}$ may be different, e.g., the front coating thickness $T_{CF}$ may be greater than the side coating thickness $T_{CS}$. Furthermore, each side coating thickness $T_{CS}$ may be uniform along the thickness or depth of the screen, or may be varied. For example, the side coating thickness adjacent the front face of the screen may be greater than the side coating thickness adjacent the rear face of the screen to provide a tapered coating. Such variable coating thicknesses may be produced due to the magnetic field generated through the screen during the coating process, as more fully described below.

In accordance with the present invention, the wear-resistant coating 18 is applied to the coating bar substrate 16 under the influence of a magnetic field. The term "magnetic field" is intended to mean a magnetic field that is above the earth's ambient magnetic field.

FIG. 3 is an isometric view of a screen 10 similar to that shown in FIG. 1, with permanent magnets 20 applied to the back surface of the screen 10. In the embodiment shown in FIG. 3, three magnets 20 are shown, each of which extend substantially the full height H of the screen 10, and a portion of its width W. Although three permanent magnets 20 are shown in FIG. 3, any other suitable number, shape, size and configuration of permanent magnets may be used. Furthermore, instead of permanent magnets, a magnetic field may be applied to the screen 10 by any other suitable means such as a series of wire coils (not shown) surrounding a portion of the screen through which electric current is generated to produce a magnetic field in the magnetically permeable screen.

Figure 4:
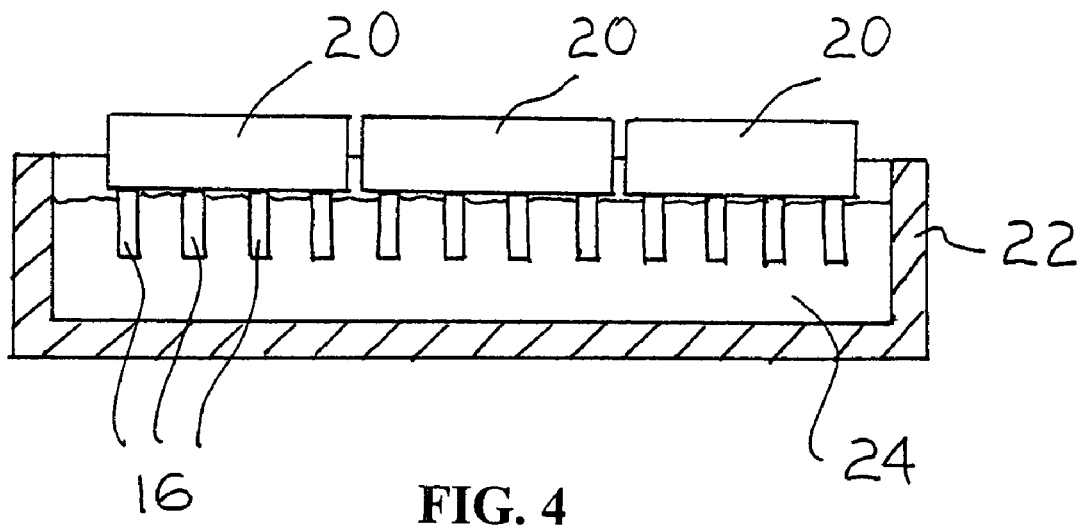
FIG. 4 is a partially schematic end view of a screen and magnet assembly similar to that shown in FIG. 3 immersed in a viscous wear-resistant coating material in accordance with an embodiment of the present invention.

The screen and magnet assembly shown in FIG. 3 may be used in a dip-coating process such as that schematically shown in FIG. 4. A tray or pan 22 is partially filled with a viscous wear-resistant coating material 24 having a composition as more fully described below. The grate bar substrates 16 to be coated and the backing magnets 20 are lowered into the pan 22, for example, to a level at which the grate bar substrates 16 are almost fully submerged in the viscous wear-resistant coating material 24, with the magnets 20 remaining slightly above the surface of the viscous coating material.

The viscous wear-resistant coating material 24 contains ferromagnetic or paramagnetic hard particles such as cemented carbides, nitrides, borides and/or carbonitrides. One preferred example of a suitable hard particle is cobalt cemented tungsten carbide particles. Other examples of suitable cemented hard particles, in addition to cemented tungsten carbide, include one or more of cemented vanadium carbide, cemented niobium carbide, cemented chromium carbide, cemented titanium carbide, cemented tantalum carbide, cemented molybdenum carbide, cemented hafnium carbide, cemented silicon carbide and cemented boron carbide. Cemented oxides such as aluminum oxide, zirconium oxide and hafnium oxide may also be used as the hard particles. The cemented hard particles may be bonded together by any one or more of nickel, cobalt, iron and their alloys, as well as copper-based alloys or aluminum-based alloys.

In addition to the hard particles, the viscous wear-resistant coating material 24 contains a braze material. The braze material can comprise the ferromagnetic or paramagnetic component of the viscous coating material. One exemplary braze material is a nickel-chromium-boron braze alloy. The viscous coating material 24 can contain additional components (e.g., a polymeric agent) that assist in the flowability and application of the coating to the substrate. Additional descriptions of the hard particles, the braze material and other components of the viscous coating material are set out hereinafter.

Figure 5:
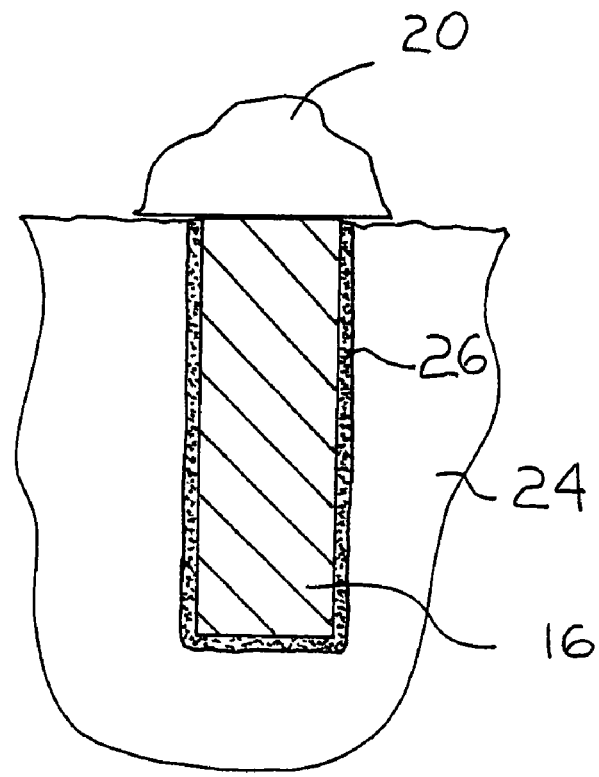
FIG. 5 is a cross-sectional view of one of the grate bars of the screen as shown in FIG. 4 submerged in the viscous wear-resistant material under the influence of a magnetic field in accordance with an embodiment of the present invention.

FIG. 5 is a cross-sectional view of one of the grate bar substrates 16 shown in FIG. 4 submerged in the viscous wear-resistant coating material 24. Under the influence of a magnetic field generated by the magnet 20 through the magnetically permeable grate bar substrate 16, the constituents of the viscous wear-resistant coating material 24 are preferentially deposited on the side and lower surfaces of the grate bar substrate 16 to form a coating 26 comprising a combination of the wear-resistant particles and the braze alloy particles. As more fully described below, the wear-resistant particles are attracted by the magnetic field and are deposited on the grate bar substrate 16 in relatively high concentrations in comparison with the concentration of the wear-resistant particles in the viscous wear-resistant coating material 24. The resultant deposited material coating 26 is relatively thick and has a relatively high concentration of tungsten carbide particles uniformly distributed throughout the thickness of the deposited coating. Due to the magnetic attraction of the wear-resistant particles to the substrate 16, the concentration of the braze alloy in the deposited coating is less than the concentration in the viscous wear-resistant coating material 24.

After the wear-resistant coating 26 is deposited on the screen 10, it is removed from the container 22 and the coating is allowed to dry and solidify. It is typical that the coating air dries. It is also contemplated that heat can be applied to the coating to assist in the drying thereof. As will become apparent from the discussion below, the magnet 20 can either be immediately removed from the screen 10 after the screen 10 has been removed from the viscous wear-resistant coating material 24, or the magnet 20 may remain on the screen 10 until the coating has dried, i.e., become solid.

Once the coating has dried, either with or without the application of heat, the screen 10 with the dried coating thereon is heated to a temperature above the solidus of the braze material to effect the metallurgical bonding of the hard particles to the braze material. This heating step is the final step in the process that solidifies (or transforms) the viscous wear-resistant coating into a wear-resistant coating on the screen. As can be appreciated the temperatures can vary depending upon the properties of the braze material, but exemplary temperatures range between a lower limit equal to about 875° C. and an upper limit equal to about 1,230° C. It should also be appreciated that the heating process to effect the metallurgical bonding may include multiple steps. Exemplary heating processes to effect the metallurgical bonding are set forth in U.S. Pat. No. 6,649,682 to Breton et al.

In a specific embodiment in which one or more magnets are positioned on the surface of the screen, each magnet will cause at least a portion of the screen to be under the influence of a magnetic field. Each magnet will not, however, typically cause the entire screen to be under the influence of the magnetic field which means that another portion of the screen is not under the influence of the magnetic field. In such a situation, it can be expected that the thickness of the wear-resistant coating in the vicinity of the portion of the screen under the influence of the magnetic field will be thicker than the thickness of the wear-resistant coating in the vicinity of those portion(s) of the screen not under the influence of the magnetic field. It can thus be appreciated that the placement and the strength of the magnets produces a screen with a wear-resistant coating wherein the wear-resistant coating can have a predetermined thickness at a selective location (i.e., a coating with a selectively variable thickness). For example, the coating thickness $T_{CF}$ at the front of the screen may be greater than the side coating thickness $T_{CS}$ of the openings through the screen, e.g., the front coating thickness $T_{CF}$ may be from 10 to 100 percent thicker than the side coating thickness $T_{CS}$. Furthermore, the side coating thickness $T_{CS}$ may vary along the thickness or depth of the screen, e.g., the side coating thickness adjacent to the front face of the screen may be from 10 to 100 percent greater than the side coating thickness adjacent to the rear face of the screen.

Referring to the viscous wear-resistant coating material, the preferred hard particles comprise cobalt cemented tungsten carbide particles. In regard to the composition of the cobalt cemented tungsten carbide particles, these particles comprise between about 5.5 weight percent and about 6.8 weight percent cobalt and between about 93.2 weight percent and about 94.5 weight percent tungsten carbide. In another compositional range, these particles comprise between about 5.5 weight percent and about 10.5 weight percent cobalt and between about 89.5 weight percent and about 94.5 weight percent tungsten carbide. The cemented tungsten carbide particles have a size that ranges between about 37 micrometers and about 53 micrometers.

The braze material can comprise any one or more of the following: nickel, chromium, boron, silicon, iron, aluminum, gold, copper, manganese, copper-based alloys, aluminum-based alloys, other precious metals and alloys thereof. A preferred braze material is a nickel-chromium-boron braze alloy that has the following compositions: 4.0 wt percent B, 15.5 wt percent Cr and remainder Ni.

The viscous wear-resistant coating material may further include a polymeric agent. The polymeric agent can be selected from the group comprising one or more of crosslinked, acrylic emulsions. A preferred polymeric agent is an acrylate polymer that is sold by Rohm and Haas under the name Acrysol ASE-60. The viscosity of the wear-resistant coating material may be varied in order to facilitate its deposition on the screen.

Tests were run to evaluate the process of the present invention. These tests are described along with the result hereinafter. For all of the tests, the viscous coating material comprised a water-based paint that contained cobalt cemented tungsten carbide particles and a nickel-chromium-boron braze alloy and an acrylate polymer to hold the particles in suspension. The paint was thixotropic. The paint had a viscosity of 160,000 cP as measured with a Brookfield viscometer rotating at 0.5 rotations per minute (according to ASTM Standard D2196) and had a density of about 5.0 grams per cubic centimeter as measured according to ASTM Standard D1475. The pH of the paint was neutral to slightly basic as measured according to ASTM Standard E70. The paint used in the tests was made according to the method as outlined in U.S. Pat. No. 6,649,682. More specifically, the following components were mixed together: 1890 ml water, 42 gm Surfynol DF-75, 51 gm Surfynol CT 131, 51 gm Surfynol 420 sold by Air Products, Inc., 27 ml of 5 percent wt KOH in water, 9630 grams of cemented tungsten carbide (6 weight percent cobalt and the balance tungsten carbide) with a mean grain size equal to 44 microns, and 8667 grams of a nickel (balance)-chromium (15.5 weight percent)-boron (4.0 weight percent) eutectic braze alloy. Then 78 ml of Acrysol 60 thickening agent was titrated into the mixture as it was being stirred. The resulting viscosity was as set forth above.

A grate similar to that shown in FIG. 1 made of carbon steel was used as the substrate screen. The grate had a height of about 2 feet, a width of about 4 feet, and a depth of about 1 inch. The grate included twenty-seven parallel horizontal grate bars attached together by three vertical support bars. Each horizontal grate bar was 1/8 inch thick, and the spacing between adjacent grate bars was 5/16 inch. The grate was grit blasted and chemically cleaned to remove any foreign material contamination. After cleaning the grate, it was cut into two equal pieces. In the first test, one piece of the grate was coated with the viscous coating material using a dip coating method in which the front face of the grate was submerged in the viscous coating material to a depth at which the entire grate was covered. After 2 minutes, the grate was removed from the viscous coating material and air dried. A magnetic field was not used during this test.

During the second test, the other piece of grate was uniformly magnetized by placing commercially available universal magnets on the back side of the grate similar to the arrangement shown in FIG. 3. After magnetizing the grate, the viscous coating material was applied by dipping the grate into the viscous coating material to a depth at which most of the grate was submerged but the magnets remained above the surface. After 2 minutes, the grate was removed from the viscous coating material and air dried. The magnets were removed after paint was dried completely. Both tests were performed at atmospheric conditions and paint viscosity was maintained 160,000 cP.

After the paint was dried completely on both pieces, they were brazed in a vacuum furnace at 2,060° F. A small cladded portion was cut from both pieces of grate and studied by using a microscope.

Figure 6:
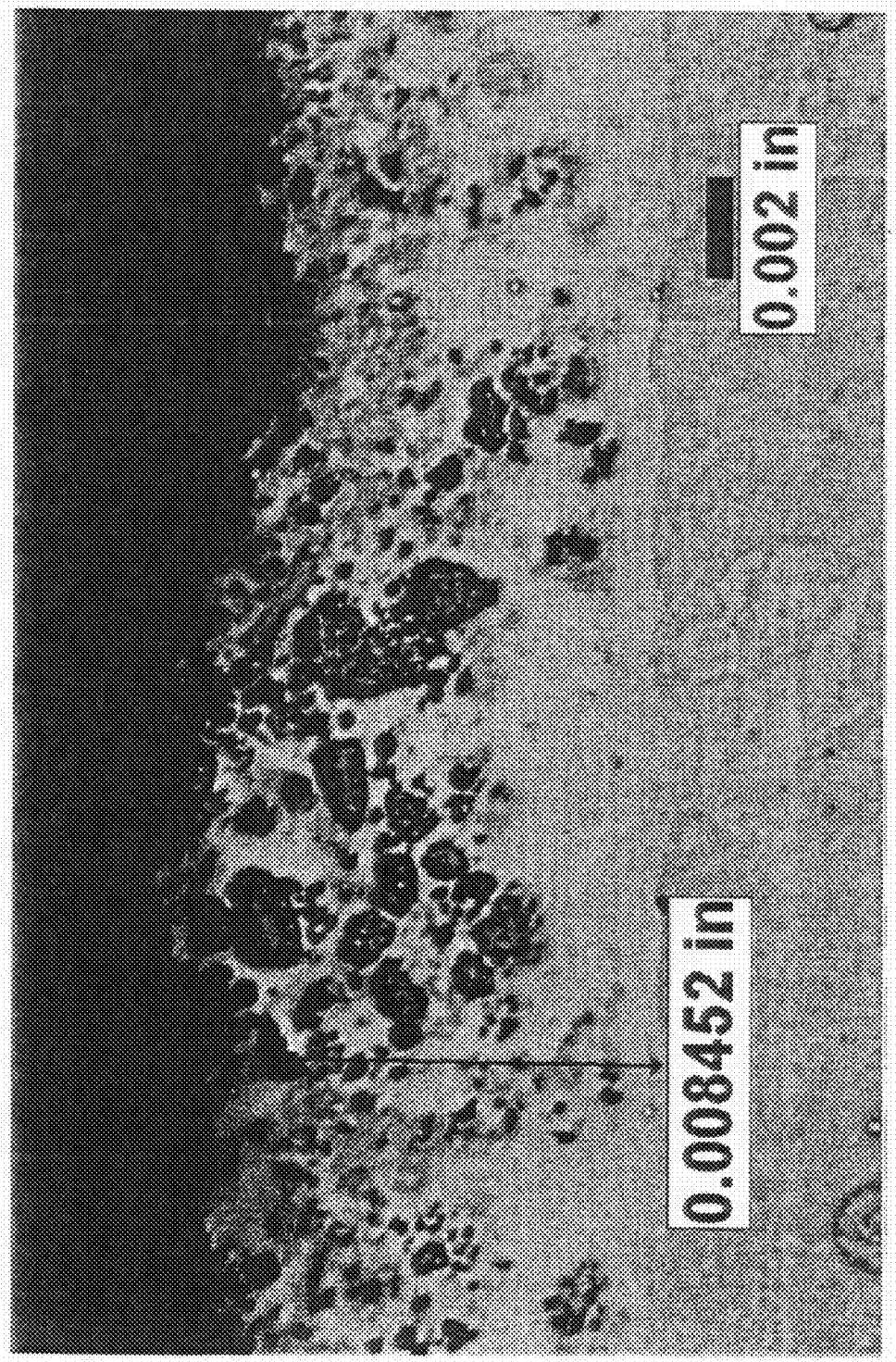
FIG. 6 is a photomicrograph showing a composite coating material comprising tungsten carbide particles in a brazing alloy matrix deposited on a steel grate substrate in the absence of a magnetic field, illustrating a relatively low concentration of the tungsten carbide particles non-uniformly distributed in a matrix of the brazing alloy.
Figure 7:
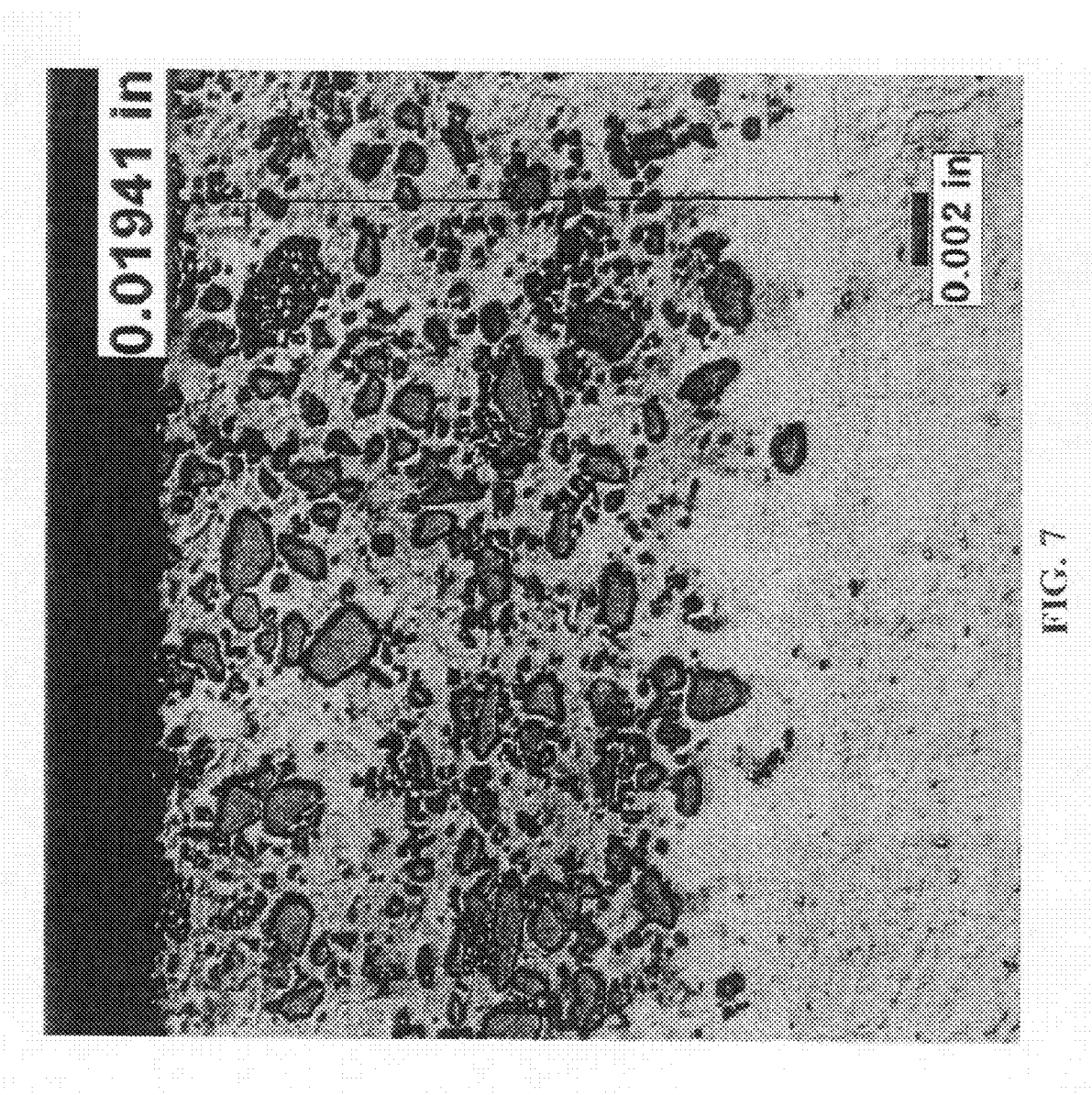
FIG. 7 is a photomicrograph showing a wear-resistant composite coating material comprising tungsten carbide particles in a brazing alloy matrix deposited on a steel grate substrate under a magnetic field in accordance with an embodiment of the present invention, illustrating an increased coating thickness, increased tungsten carbide concentration, and more uniform tungsten carbide distribution throughout the brazing alloy matrix in comparison with the coating shown in FIG. 6.

FIG. 6 shows the microstructure of the coating applied on the grate without the magnetic field corresponding to the first test. FIG. 7 shows the microstructure of the coating applied on the grate under the influence of the magnetic field corresponding to the second test. A final coating thickness of approximately 0.0085 inch was achieved in the first test where the magnetic field was not used. A final coating thickness of about 0.0194 inch was achieved in the second test where the magnetic filed was applied. The coating thickness shown in FIG. 7 is approximately twice the coating thickness shown in FIG. 6.

FIGS. 6 and 7 also show differences between the distributions of the tungsten carbide particles in the braze alloy matrices for the coatings. The coating applied using the magnetic field (FIG. 7) has a substantially uniform distribution of tungsten carbide particles in the braze alloy matrix compared to the coating applied without the magnetic field (FIG. 6). A uniform distribution of tungsten carbide throughout the wear-resistant coating can thus be achieved by magnetizing the grate during application of the viscous coating material, while the coating applied without the use of magnets has a non-uniform distribution of tungsten carbide.

The percentages of tungsten carbide in the coatings produced by the first and second tests were measured by commercially available image analysis software which calculates the percentage area of the various constituents like tungsten carbide, braze matrix, porosity, etc. using photomicrographs. Micro photographs were taken of the coating applied in Test 1 and Test 2, and the area percentage of the tungsten carbide was measured using the image analysis software for both the coatings applied using and without using magnets. Table 1 shows the area percentage of tungsten carbide present in each of the coatings.

TABLE 1

Percentage of WC present in coatings

| Coating | Area % of WC |
|---|---|
| Test 1 - Coating applied without magnetizing the grate | 15% |
| Test 2 - Coating applied by magnetizing the grate | 27% |

The area percentage of tungsten carbide present in the coating applied by magnetizing the grate is almost double the area percentage of tungsten carbide present in the coating applied without magnetizing the grate. The balance of each coating comprises the braze alloy matrix.

The wear-resistant coatings of the present invention provide significantly greater abrasion resistance in comparison with un-coated screens. For example, the Abrasion Resistance Factor, as measured in accordance with the ASTM G65 test specification, of screens coated in accordance with the present invention may be 5, 10 or even 20 times greater than similar un-coated screens.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of forming a wear-resistant coating on a screen comprising the steps of:
    providing a screen having a front face, a rear face, and openings extending through the screen from the front face to the rear face;
    contacting at least a portion of the screen with a coating material comprising ferromagnetic or paramagnetic hard particles and a braze material;
    subjecting at least a portion of the screen to a magnetic field during at least a portion of the contacting step to thereby attract the hard particles toward the screen; and
    subsequently transforming the coating material to a wear-resistant coating comprising the hard particles distributed in the braze material.

2. The method of claim 1, wherein the screen is substantially planar and has a height of from about 0.3 to about 6 m, a width of from about 0.3 to about 6 m, and a depth of from about 0.03 to about 4 cm.

3. The method of claim 1, wherein the screen comprises a grate including a plurality of substantially parallel bars spaced apart from each other.

4. The method of claim 3, wherein the bars have cross-sectional thicknesses measured in a plane parallel with the front face of the screen of from about 0.15 to about 0.8 cm, and the bars are spaced apart from each other a distance of from about 0.4 to about 6 cm.

5. The method of claim 1, wherein the screen comprises magnetically permeable steel.

6. The method of claim 1, wherein the coating material comprises a viscous liquid including the hard particles and particles of the braze material.

7. The method of claim 6, wherein the hard particles comprise a cemented carbide.

8. The method of claim 6, wherein the hard particles comprise cobalt cemented tungsten carbide.

9. The method of claim 6, wherein the braze material comprises a ferromagnetic or paramagnetic braze alloy.

10. The method of claim 6, wherein the braze material comprises an alloy comprising Ni, Cr and B.

11. The method of claim 6, wherein the viscous coating material has a ratio of the hard particles to the braze material particles that is lower than a ratio of the hard particles to the braze material in the wear-resistant coating.

12. The method of claim 6, wherein the contacting step comprises dipping the screen into the coating material.

13. The method of claim 12, wherein the screen is partially submerged in the coating material.

14. The method of claim 1, wherein the subjecting step comprises placing at least one permanent magnet adjacent to the screen.

15. The method of claim 14, wherein the at least one permanent magnet is attached to the rear face of the screen.

16. The method of claim 15, wherein the at least one permanent magnet covers substantially the entire rear face of the screen.

17. The method of claim 15, wherein the front face of the screen is submerged in the coating material, and the rear face of the screen and the at least one permanent magnet are not submerged in the coating material.

18. The method of claim 1, wherein the coating material is transformed to the wear-resistant coating by heating the coating material to a temperature above a solidus temperature of the braze material.

19. The method of claim 1, wherein the wear-resistant coating has a thickness of from about 0.1 to about 3 mm.

20. The method of claim 1, wherein the wear-resistant coating comprises a substantially uniform distribution of the hard particles in a matrix of the braze material.

21. The method of claim 20, wherein a weight ratio of the hard particles to the braze material matrix in the wear-resistant coating is greater than a weight ratio of the hard particles to the braze material in the coating material.

22. The method of claim 1, wherein the wear-resistant coating has a thickness on the front face of the screen greater than a thickness on the openings through the screen.

23. The method of claim 1, wherein the wear-resistant coating has a thickness on the openings through the screen that varies along the depth of the screen.

24. The method of claim 23, wherein the thickness of the wear-resistant coating on the openings is greater adjacent to the front face of the screen than adjacent to the rear face of the screen.

25. A method of forming a wear-resistant coating on an article of manufacture comprising the steps of:
    contacting at least a portion of the article of manufacture with a coating material comprising ferromagnetic or paramagnetic hard particles and a braze material;
    subjecting at least a portion of the article of manufacture to a magnetic field during at least a portion of the contacting step to thereby attract the hard particles toward the article of manufacture; and
    subsequently transforming the coating material to a, wear-resistant coating comprising the hard particles distributed in the braze material, wherein the coating material has a ratio of the hard particles to the braze material that is lower than a ratio of the hard particles to the braze material in the wear-resistant coating.

26. The method of claim 25, wherein the article of manufacture comprises magnetically permeable steel.

27. The method of claim 25, wherein the coating material comprises a viscous liquid including the hard particles and particles of the braze material.

28. The method of claim 27, wherein the hard particles comprise a cemented carbide.

29. The method of claim 27, wherein the hard particles comprise cobalt cemented tungsten carbide.

30. The method of claim 27, wherein the braze material comprises a ferromagnetic or paramagnetic braze alloy.

31. The method of claim 27, wherein the braze material comprises an alloy comprising Ni, Cr and B.

32. The method of claim 25, wherein the percent by area of the hard particles in the wear-resistant coating is at least 20 percent.

33. The method of claim 25, wherein the percent by area of the hard particles in the wear-resistant coating is at least 25 percent.

* * * * *